United States Patent
McIntosh

(10) Patent No.: US 10,371,313 B2
(45) Date of Patent: Aug. 6, 2019

(54) LOAD RELIEF TIE ROD

(71) Applicant: The Boeing Company, Chicago, IL (US)

(72) Inventor: Darren Carl McIntosh, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 665 days.

(21) Appl. No.: 15/045,521

(22) Filed: Feb. 17, 2016

(65) Prior Publication Data

US 2017/0234479 A1 Aug. 17, 2017

(51) Int. Cl.
| | | |
|---|---|---|
| F16F 1/12 | (2006.01) | |
| F16F 9/30 | (2006.01) | |
| B64D 11/00 | (2006.01) | |
| F16F 15/08 | (2006.01) | |
| F16M 13/02 | (2006.01) | |
| F16F 15/067 | (2006.01) | |

(52) U.S. Cl.
CPC .......... *F16M 13/02* (2013.01); *B64D 11/003* (2013.01); *F16F 1/128* (2013.01); *F16F 9/303* (2013.01); *F16F 15/067* (2013.01); *F16F 15/08* (2013.01); *F16F 2230/007* (2013.01)

(58) Field of Classification Search
CPC ........ B64D 23/00; B64D 29/06; B64D 29/00; B64D 27/10; B64C 2027/002; B64C 25/50; B64C 27/001; F01D 25/265; F01D 25/04; F01D 25/28; F05D 2220/323; F05D 2260/38; F16F 15/022; F16F 1/128; F16F 2236/06; Y10S 416/50; Y10T 403/7077; Y10T 403/32483
USPC ......................................................... 188/268
See application file for complete search history.

(56) References Cited

U.S. PATENT DOCUMENTS

| | | | | |
|---|---|---|---|---|
| 562,300 | A | * 6/1896 | Howe | ...................... F16F 1/128 |
| | | | | 267/71 |
| 1,037,589 | A | 9/1912 | Browning | |
| 3,412,869 | A | * 11/1968 | Wallace | .................... B61G 9/08 |
| | | | | 188/268 |
| 4,974,794 | A | * 12/1990 | Aubry | ................... B64C 27/001 |
| | | | | 244/17.27 |
| 6,145,785 | A | 11/2000 | Certain | |

(Continued)

FOREIGN PATENT DOCUMENTS

| | | |
|---|---|---|
| DE | 19504961 A1 | 8/1996 |
| EP | 2445281 A2 | 5/2012 |
| GB | 1333246 A | 10/1973 |

OTHER PUBLICATIONS

Image of a car shock replacement, Last Chance Auto Repair, dated Jun. 2011, 1 page. http://www.lastchanceautorepairs.com/wp-content/uploads/2011/06/Car-Shock-Replacement.png.

(Continued)

*Primary Examiner* — Robert A. Siconolfi
*Assistant Examiner* — San M Aung
(74) *Attorney, Agent, or Firm* — Yee & Associates, P.C.

(57) ABSTRACT

A method and apparatus are provided. A load relief tie rod comprises a body, a rod, and at least one pin extending from and perpendicular to the rod. The body has a cavity extending longitudinally through a cylindrical section of the body and two obround slots in the cylindrical section. The rod is configured to extend longitudinally within the cavity. The at least one pin extends through the two obround slots.

12 Claims, 13 Drawing Sheets

(56) References Cited

U.S. PATENT DOCUMENTS

| | | | |
|---|---|---|---|
| 7,234,664 B1 | 6/2007 | Anderson | |
| 2009/0242190 A1* | 10/2009 | Wagner | E21B 17/07 166/156 |
| 2012/0125010 A1* | 5/2012 | Michael | B64C 7/02 60/782 |
| 2016/0010502 A1* | 1/2016 | Byrne | B64D 33/00 415/213.1 |
| 2016/0298714 A1* | 10/2016 | Schmidt | F16F 9/36 |

OTHER PUBLICATIONS

Harris, "How Car Suspensions Work—Dampers: Shock Absorbers," HowStuffWorks, a division of InfoSpace, LLC, May 2005, 9 pages. http://auto.howstuffworks.com/car-suspension2.htm.
Extended European Search Report, dated Jun. 19, 2017, regarding Application No. 16195030.8, 9 pages.

\* cited by examiner

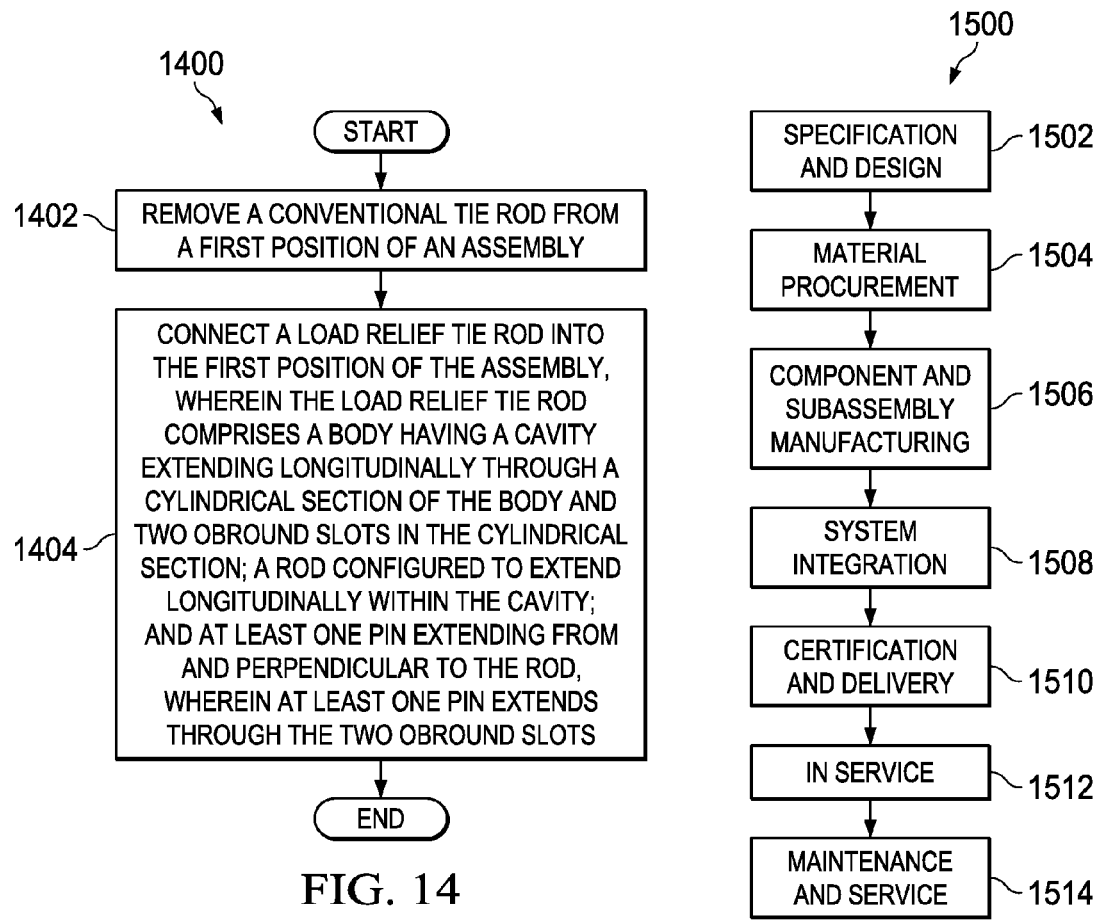
FIG. 14
FIG. 15
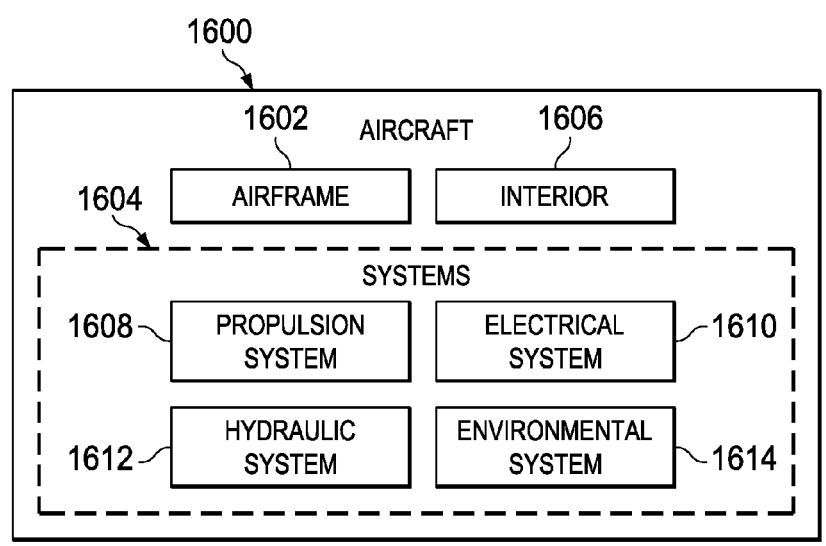
FIG. 16

LOAD RELIEF TIE ROD

BACKGROUND INFORMATION

1. Field

The present disclosure relates generally to platforms, in particular, to transferring loads in platforms. Still more particularly, the present disclosure relates to a method and apparatus for load relief tie rods.

2. Background

Tie rods may be used in the interior of an aircraft to connect components to the fuselage. More specifically, tie rods may connect overhead storage compartments to the fuselage. Tension rods may also connect galleys, closets, or other components to the fuselage. However, tension or compression loads in the fuselage may be transferred through conventional tie rods. Loads transferred through conventional tie rods may cause door binding or other undesirable conditions. Therefore, it would be desirable to have a method and apparatus that take into account at least some of the issues discussed above, as well as other possible issues.

SUMMARY

An embodiment of the present disclosure provides a load relief tie rod. The load relief tie rod comprises a body, a rod, and at least one pin extending from and perpendicular to the rod. The body has a cavity extending longitudinally through a cylindrical section of the body and two obround slots in the cylindrical section. The rod is configured to extend longitudinally within the cavity. The at least one pin extends through the two obround slots.

Another embodiment of the present disclosure provides a load relief tie rod. The load relief tie rod comprises a body, an end cap, a rod, and at least one pin. The body has a first end, a second end, a cylindrical section, a cavity extending longitudinally through the cylindrical section from the first end towards the second end, and two obround slots in the cylindrical section. The end cap is associated with the first end of the body. The rod extends through the end cap and is configured to extend longitudinally within the cavity. The at least one pin extends from and is perpendicular to the rod. The at least one pin extends through the two obround slots.

Yet another embodiment of the present disclosure provides a method of providing at least one of tension relief or compression relief. A conventional tie rod is removed from a first position of an assembly. A load relief tie rod is connected into the first position of the assembly. The load relief tie rod comprises a body having a cavity extending longitudinally through a cylindrical section of the body and two obround slots in the cylindrical section; a rod configured to extend longitudinally within the cavity; and at least one pin extending from and perpendicular to the rod, wherein the at least one pin extends through the two obround slots.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a flowchart of a method for providing at least one of tension relief or compression relief in accordance with an illustrative embodiment;

FIG. 15 is an illustration of an aircraft manufacturing and service method in the form of a block diagram in accordance with an illustrative embodiment; and FIG. 16 is an illustration of an aircraft in the form of a block diagram in which an illustrative embodiment may be implemented.

DETAILED DESCRIPTION

The different illustrative embodiments recognize and take into account one or more different considerations. For example, the illustrative embodiments recognize and take into account that loads transferred may cause undesirable conditions including but not limited to door binding. The illustrative embodiments also recognize and take into account that current methods for correcting door binding may include performing test flights. Each test flight to identify door binding may cost tens of thousands of dollars.

The illustrative embodiments further recognize and take into account that conventional methods for correcting door binding may include changing at least one of the aircraft or the connected components such as a galley, closet, or other type of component. However, modification to the aircraft or connected components may be at least one of more expensive or more time-consuming than desired. Further, changing the connected components may include recertification of the design for the connected components. Door binding or other undesirable conditions are usually identified late in an airplane's build. Therefore, making recertification may not be a realistic or viable option.

Figure 1:
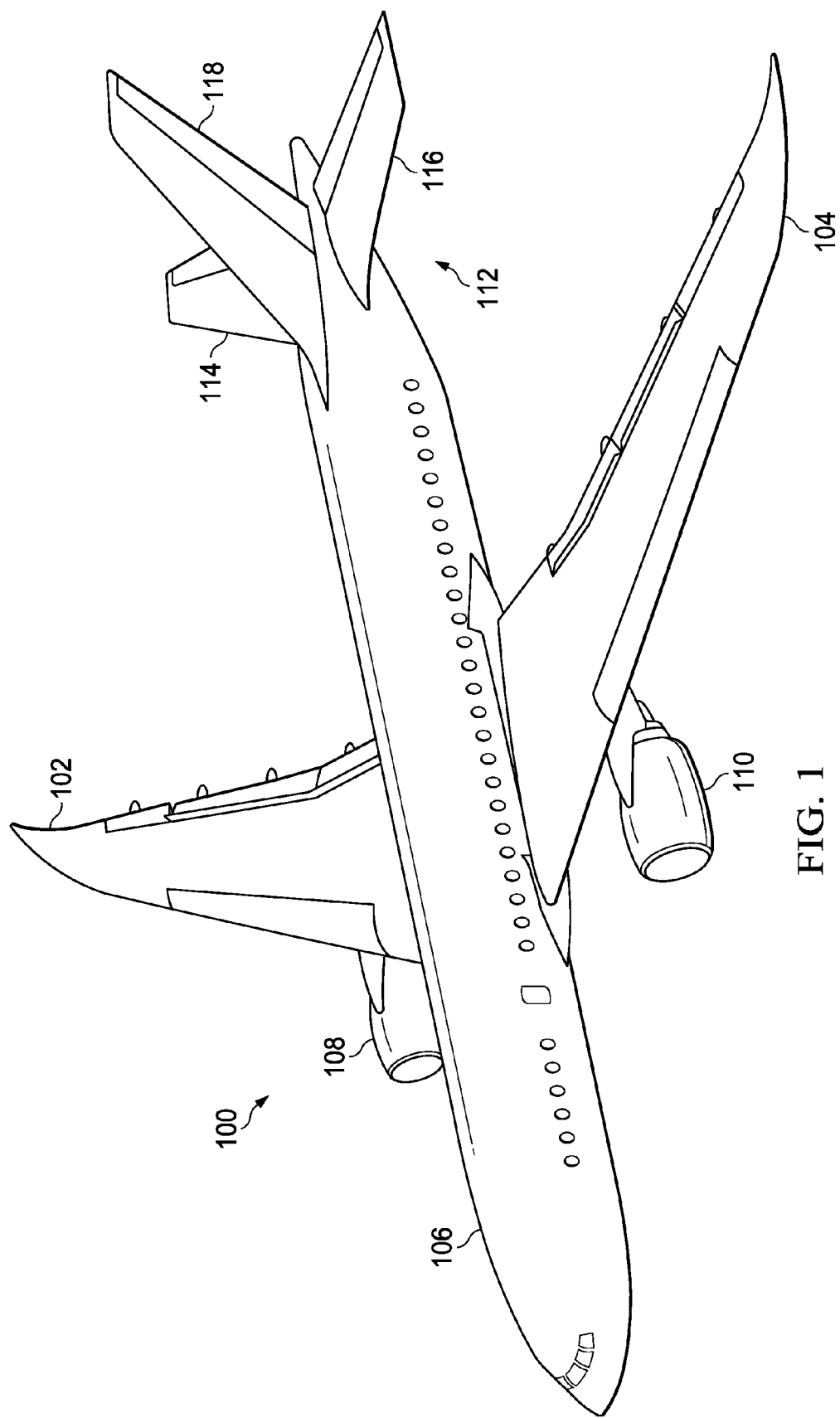
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having connected components that may be connected using a load relief tie rod in accordance with an illustrative embodiment. For example, load relief tie rods may be used inside of body 106 of aircraft 100.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a manufacturing facility, a building, or other suitable platforms.

Figure 2:
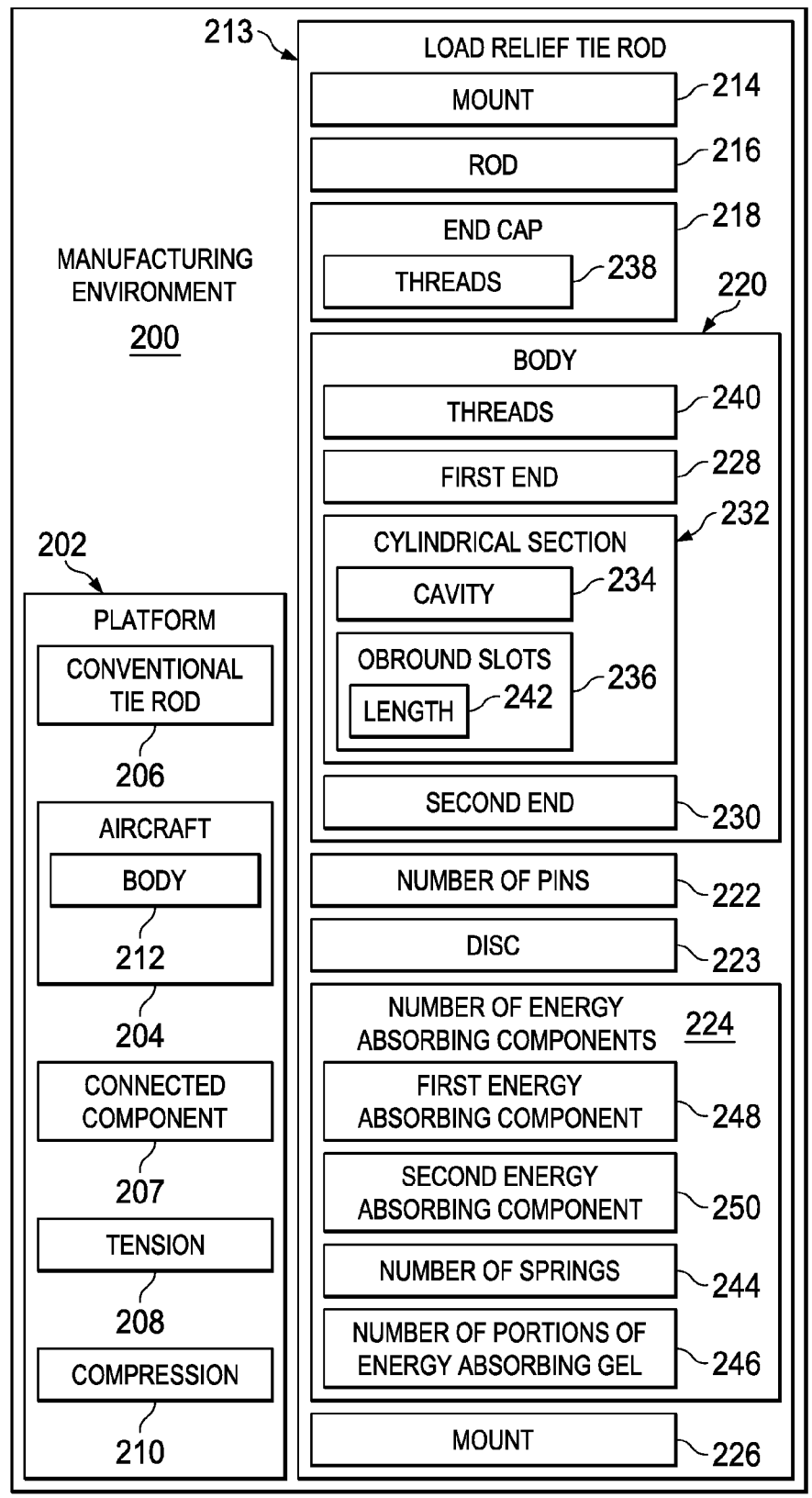
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. Manufacturing environment 200 may be an example of an environment in which components may be connected to aircraft 100 of FIG. 1. In some illustrative examples, aircraft 100 may be manufactured in manufacturing environment 200.

In some illustrative examples, platform 202 may be a representation of aircraft 100. Platform 202 may be aircraft 204. Platform 202 may include conventional tie rod 206 and connected component 207. Aircraft 204 may have at least one of tension 208 or compression 210.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

For example, body 212 of aircraft 204 may change shape when aircraft 204 is pressurized. As a result, conventional tie rod 206 connected to body 212 of aircraft 204 may transfer at least one of tension 208 or compression 210 to connected component 207.

Conventional tie rod 206 may be replaced with load relief tie rod 213. Load relief tie rod 213 may also be called self-adjusting. A length of load relief tie rod 213 may change during use of load relief tie rod 213. Load relief tie rod 213 may provide at least one of tension relief or compression relief. Load relief tie rod 213 may not transfer one of tension 208 or compression 210 to connected components.

Load relief tie rod 213 includes mount 214, rod 216, end cap 218, body 220, number of pins 222, disc 223, number of energy absorbing components 224, and mount 226. Body 220 has first end 228, second end 230, cylindrical section 232, cavity 234 extending longitudinally through cylindrical section 232 from first end 228 towards second end 230, and obround slots 236 in cylindrical section 232.

Mount 214 may be connected to rod 216. Rod 216 extends through end cap 218, which is associated with first end 228 of body 220. End cap 218 may be associated with first end 228 of body 220 in any desirable fashion. In some illustrative examples, end cap 218 may be connected to body 220 using threads 238 and threads 240. Threads 238 and threads 240 may form a threaded connection. Rod 216 is also configured to extend longitudinally within cavity 234.

Rod 216 may move within cavity 234 as load relief tie rod 213 provides at least one of compression relief or tension relief. For example, rod 216 may move towards second end 230 to provide compression relief. As another example, rod 216 may move towards first end 228 to provide tension relief.

Number of pins 222 extends from and is perpendicular to rod 216. As used herein, "a number of," when used with reference to items, means one or more items. For example, "a number of pins" includes one or more pins. In some illustrative examples, number of pins 222 may be referred to as at least one pin. Number of pins 222 may be a single pin extending through a hole in rod 216. In some illustrative examples, this single pin may be press fit into rod 216. As another example, "number of pins" may include two pins each connected to rod 216. Two pins may be connected to rod 216 using any desirable method.

Number of pins 222 extends through obround slots 236. Obround slots 236 may include any desirable quantity of slots. In some illustrative examples, obround slots 236 include two slots.

When load relief tie rod 213 is providing compression relief or tension relief, number of pins 222 may travel along length 242 of obround slots 236. As a result, obround slots 236 provide at least one of compression relief or tension relief. Length 242 may be substantially the same for each of obround slots 236. Length 242 of obround slots 236 controls which of compression relief or tension relief are provided by obround slots 236. For example, if length 242 is centered between first end 228 and second end 230, both compression relief and tension relief may be provided. As another example, if length 242 is positioned nearer second end 230, compression relief may be provided. As yet a further example, if length 242 is positioned nearer first end 228, tension relief may be provided.

Number of pins 222 may move within obround slots 236 under normal loads. When platform 202 undergoes an ultimate load, number of pins 222 engages a rounded end of each of obround slots 236. The ultimate load may be a load beyond which platform 202 was designed. The ultimate load may be significantly greater than normal loads.

Number of energy absorbing components 224 may sometimes be referred to as at least one energy absorbing component. Number of energy absorbing components 224 absorbs at least one of tension 208 or compression 210. Accordingly number of energy absorbing components 224 provides at least one of compression relief or tension relief. Number of energy absorbing components 224 is positioned within cavity 234. In some illustrative examples, number of energy absorbing components 224 comprises number of springs 244. In some illustrative examples, number of springs 244 may be referred to as at least one spring. In other illustrative examples, number of energy absorbing components 224 comprises number of portions of energy absorbing gel 246. In some illustrative examples, number of portions of energy absorbing gel 246 may be referred to as at least one portion of energy absorbing gel.

In one example, a quantity of number of energy absorbing components 224 controls which of compression relief or tension relief are provided by number of energy absorbing components 224. For example, first energy absorbing component 248 of number of energy absorbing components 224 may be positioned within cavity 234 between number of pins 222 and second end 230 of body 220. In this example, first energy absorbing component 248 may provide compression relief. First energy absorbing component 248 may take the form of either a spring or an energy absorbing gel.

In another example, second energy absorbing component 250 of number of energy absorbing components 224 may be positioned within cavity 234 between number of pins 222 and end cap 218. Second energy absorbing component 250 may provide tension relief. Second energy absorbing component 250 may take the form of either a spring or an energy absorbing gel.

Number of energy absorbing components 224 is reusable. Accordingly, number of energy absorbing components 224 may provide repeatable relief from at least one of tension or compression.

Number of energy absorbing components 224 engages disc 223. Disc 223 provides a seat for each of energy absorbing components 224. Rod 216 and number of pins 222 may extend through holes of disc 223. Disc 223 may move within cavity 234 as rod 216 moves within cavity 234.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in FIG. 2, conventional tie rod 206 is present. In this example, load relief tie rod 213 may replace conventional tie rod 206. In other words, load relief tie rod 213 may be a retrofit to platform 202. In another example, conventional tie rod 206 may not be present. In this example, load relief tie rod 213 may be installed in platform 202 as platform 202 is being manufactured. In yet a further example, at least a portion of platform 202 may be referred to as an assembly. An assembly may include all or part of platform 202.

Figure 3:
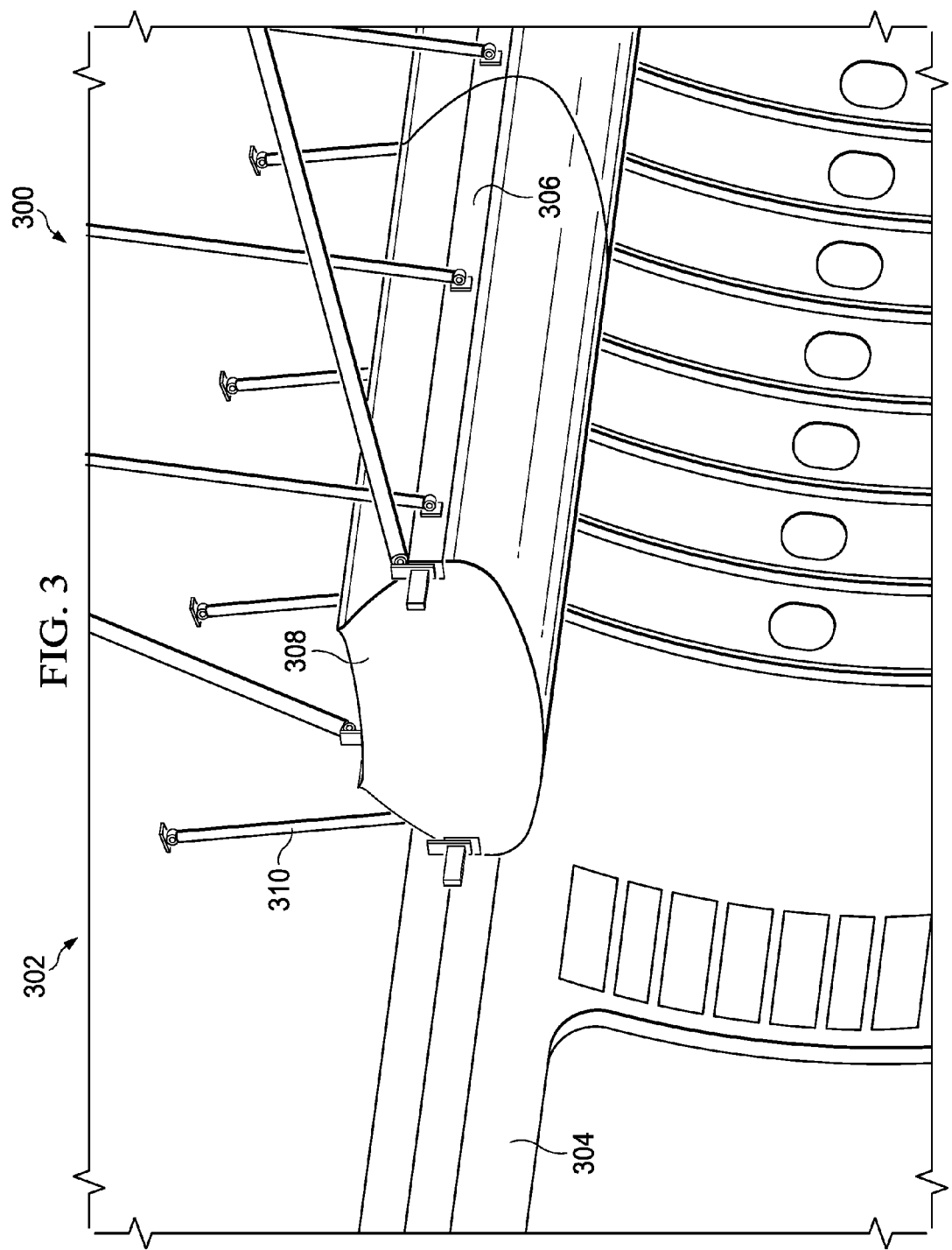
FIG. 3 is an illustration of a cabin of an aircraft in accordance with an illustrative embodiment.

Turning now to FIG. 3, an illustration of a cabin of an aircraft is depicted in accordance with an illustrative embodiment. Cabin 300 of aircraft 302 may be an example of the interior of aircraft 100 of FIG. 1.

Cabin 300 includes body 304 of aircraft 302 and connected components 306. In this illustrative example, connected components 306 take the form of overhead luggage bins 308. As illustrated, plurality of tie rods 310 connect overhead luggage bins 308 to body 304 of aircraft 302. At least one of plurality of tie rods 310 may be a physical implementation of load relief tie rod 213 of FIG. 2.

Figure 4:
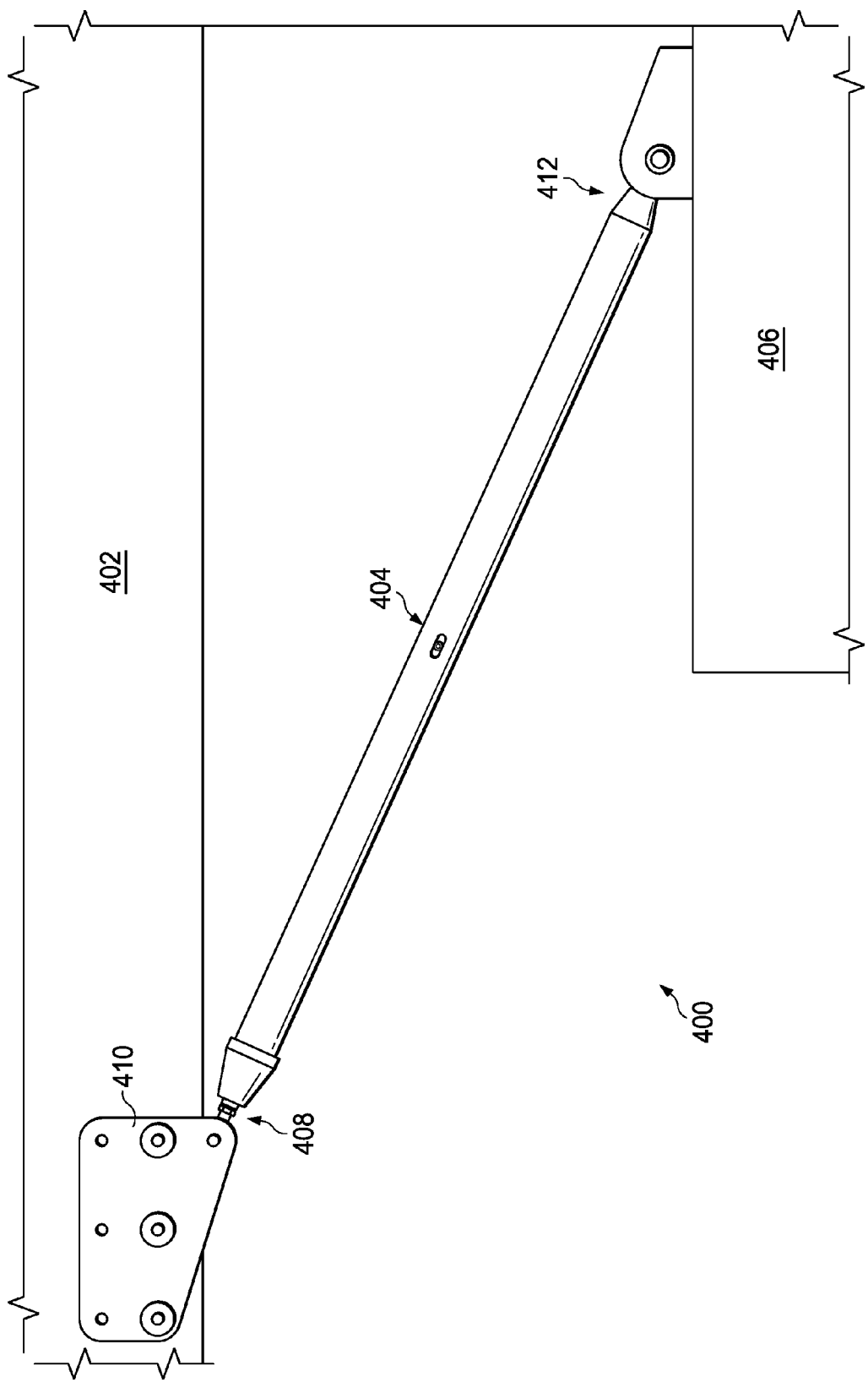
FIG. 4 is an illustration of a load relief tie rod connected in an assembly in accordance with an illustrative embodiment.

Turning now to FIG. 4, an illustration of a load relief tie rod connected in an assembly is depicted in accordance with an illustrative embodiment. Assembly 400 may be inside body 106 of aircraft 100 of FIG. 1. Assembly 400 may be a physical embodiment of a portion of platform 202 of FIG. 2. In some illustrative examples, assembly 400 may be a portion of cabin 300 of aircraft 302 of FIG. 3.

Assembly 400 includes body 402, load relief tie rod 404, and connected component 406. Body 402 may be a physical implementation of body 212 of FIG. 2. Load relief tie rod 404 may be a physical implementation of load relief tie rod 213 of FIG. 2. As depicted, load relief tie rod 404 may provide both tension relief and compression relief. Accordingly, load relief tie rod 404 may not transfer tension or compression from body 402 to connected component 406.

Connected component 406 may be any desirable type of component. For example, connected component 406 may take the form of a galley, a closet, overhead luggage bin, or any other desirable type of component. Load relief tie rod 404 may reduce or prevent door binding or other undesirable conditions in connected component 406.

As depicted, mount 408 of load relief tie rod 404 is connected to first fitting 410 while mount 412 is connected to connected component 406. Although first fitting 410 is depicted as a clevis fitting, first fitting 410 may take the form of any desirable fitting. Further, although mount 412 is depicted as connected to a lug fitting, this may take the form of any desirable fitting.

Figure 5:
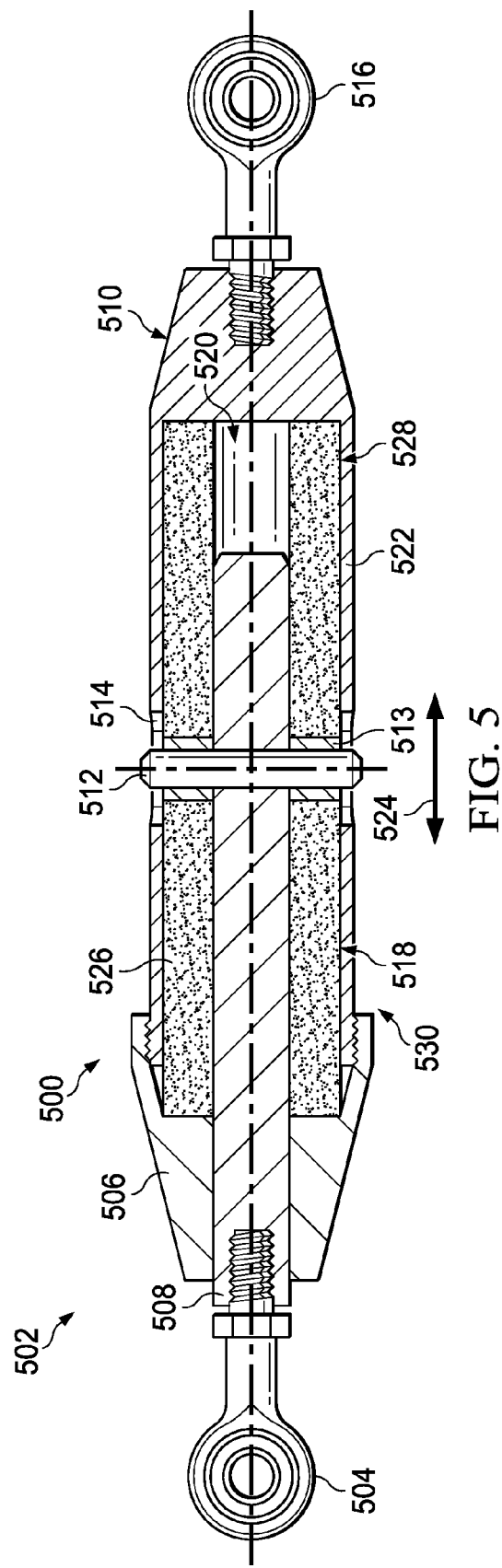
FIG. 5 is an illustration of a cross-sectional view of a load relief tie rod in accordance with an illustrative embodiment.

Turning now to FIG. 5, an illustration of a cross-sectional view of a load relief tie rod is depicted in accordance with an illustrative embodiment. Load relief tie rod 500 may be a physical implementation of load relief tie rod 213 of FIG. 2. Load relief tie rod 500 may be used in aircraft 100 of FIG. 1, cabin 300 of FIG. 3, or assembly 400 of FIG. 4.

View 502 of load relief tie rod 500 is a cross-sectional view. In view 502, mount 504, end cap 506, rod 508, body 510, pin 512, disc 513, obround slots 514, mount 516, and number of energy absorbing components 518 are visible. As depicted, mount 504 is connected to rod 508 that extends through end cap 506 and into cavity 520 of body 510. More specifically, rod 508 extends longitudinally into cavity 520 of cylindrical section 522 of body 510.

Pin 512 is associated with rod 508. In this illustrative example, pin 512 is inserted through rod 508. Pin 512 and rod 508 may have a press fit. Pin 512 extends through rod 508 and into obround slots 514. Obround slots 514 may restrict movement of pin 512.

As tension or compression is applied to load relief tie rod 500, rod 508 moves in direction 524 within cavity 520. As rod 508 moves, one of number of energy absorbing components 518 is compressed. In this illustrative example, number of energy absorbing components 518 takes the form of energy absorbing gel. Number of energy absorbing components 518 includes first energy absorbing component 526 and second energy absorbing component 528. First energy absorbing component 526 may provide tension relief. Second energy absorbing component 528 may provide compression relief.

Number of energy absorbing components 518 contacts disc 513. Disc 513 may be associated with rod 508 and pin 512. More specifically, rod 508 and pin 512 may extend through disc 513. Disc 513 provides desirable faces for number of energy absorbing components 518 to be seated against.

End cap 506 may keep second energy absorbing component 528 within cavity 520. End cap 506 may keep other parts in addition to second energy absorbing component 528 within cavity 520. End cap 506 may be connected to body 510 using any desirable method. In this illustrative example, end cap 506 may be connected to first end 530 of body 510 using a threaded connection.

Figure 6:
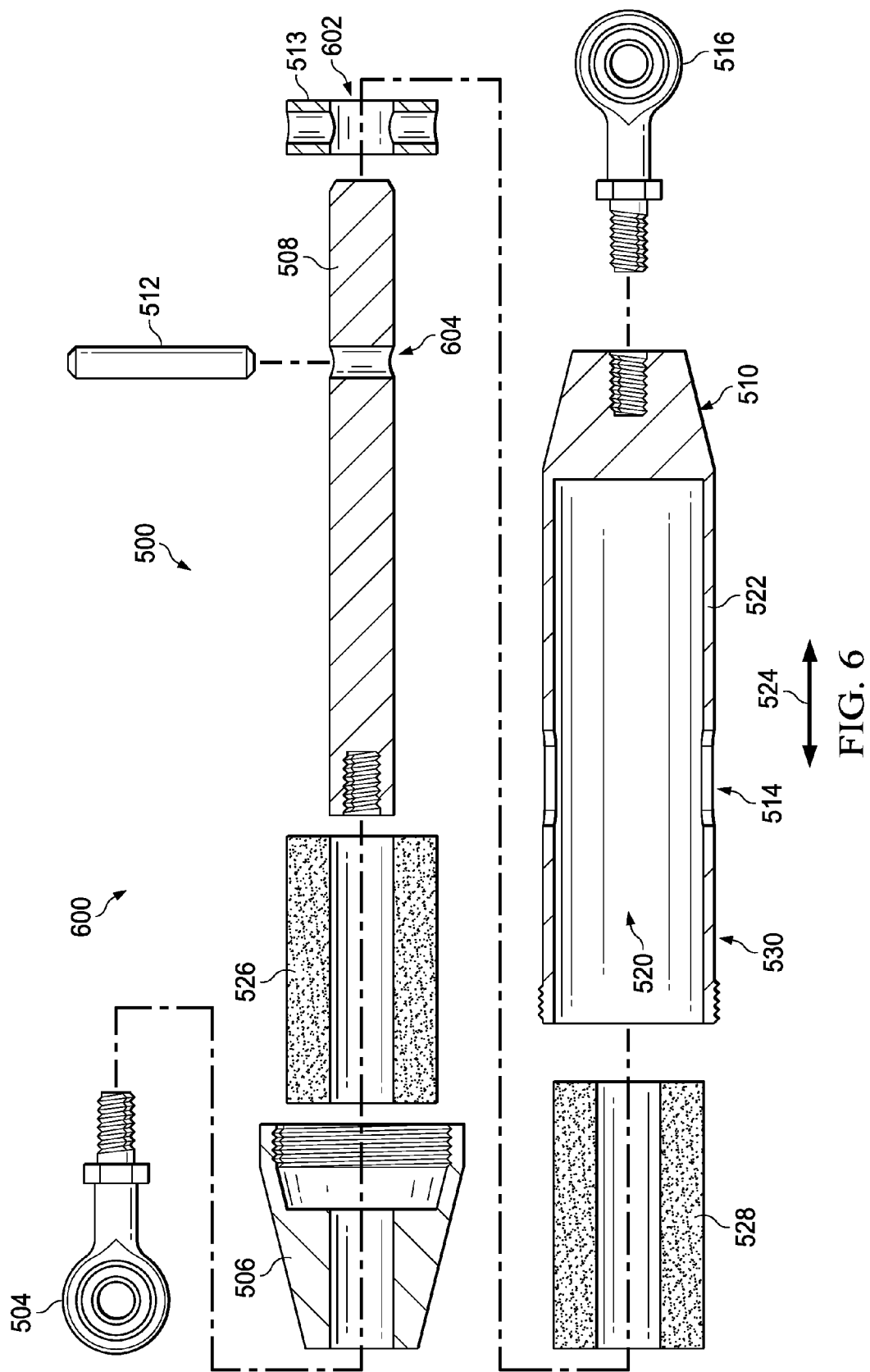
FIG. 6 is an illustration of an exploded view of a load relief tie rod in accordance with an illustrative embodiment.

Turning now to FIG. 6, an illustration of an exploded view of a load relief tie rod is depicted in accordance with an illustrative embodiment. View 600 may be an exploded view of load relief tie rod 500 of FIG. 5.

In view 600, holes 602 through disc 513 are depicted. Pin 512 and rod 508 may extend through holes 602 in disc 513 when load relief tie rod 500 is assembled. Hole 604 through rod 508 is also depicted in view 600. Pin 512 may be inserted through hole 604 when load relief tie rod 500 is assembled. Although only pin 512 is depicted in view 600, in other illustrative examples, more than one pin may be present. In these illustrative examples, the more than one pin may be connected using threads or other desirable connecting means.

Figure 7:
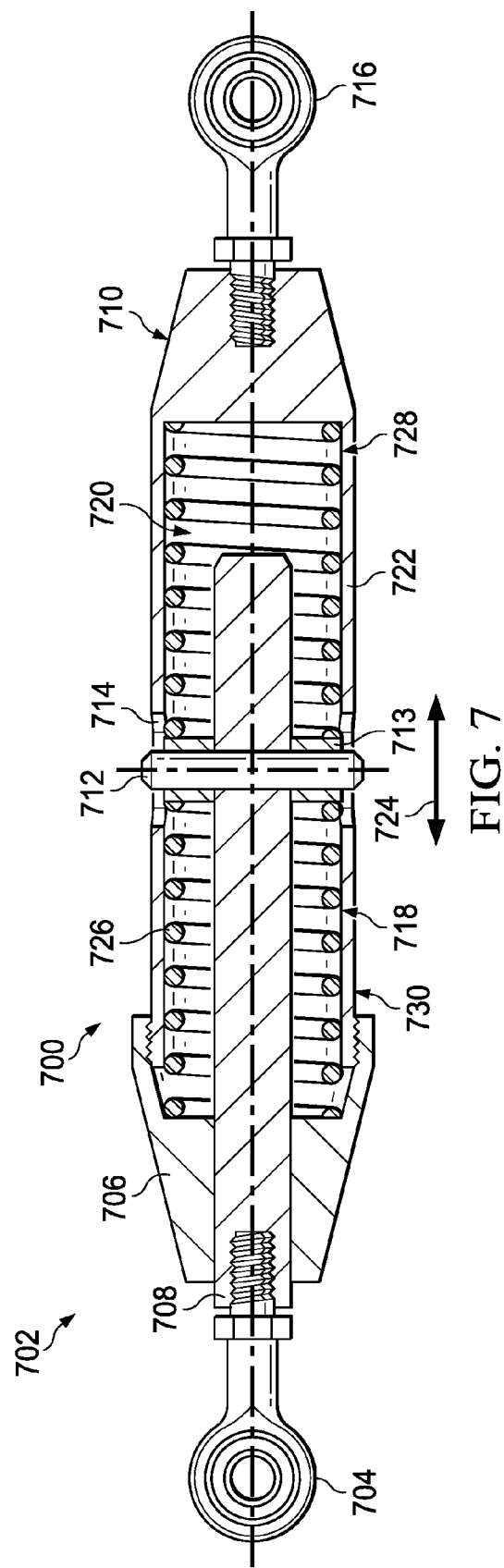
FIG. 7 is an illustration of a cross-sectional view of a load relief tie rod in accordance with an illustrative embodiment.

Turning now to FIG. 7, an illustration of a cross-sectional view of a load relief tie rod is depicted in accordance with an illustrative embodiment. Load relief tie rod 700 may be a physical implementation of load relief tie rod 213 of FIG. 2. Load relief tie rod 700 may be used in aircraft 100 of FIG. 1, cabin 300 of FIG. 3, or assembly 400 of FIG. 4.

View 702 of load relief tie rod 700 is a cross-sectional view. In view 702, mount 704, end cap 706, rod 708, body 710, pin 712, disc 713, obround slots 714, mount 716, and number of energy absorbing components 718 are visible. As depicted, mount 704 is connected to rod 708 that extends through end cap 706 and into cavity 720 of body 710. More specifically, rod 708 extends longitudinally into cavity 720 of cylindrical section 722 of body 710.

Pin 712 is associated with rod 708. In this illustrative example, pin 712 is inserted through rod 708. Pin 712 and rod 708 may have a press fit. Pin 712 extends through rod 708 and into obround slots 714. Obround slots 714 may restrict movement of pin 712.

As tension or compression is applied to load relief tie rod 700, rod 708 moves in direction 724 within cavity 720. As rod 708 moves, one of number of energy absorbing components 718 is compressed. In this illustrative example, number of energy absorbing components 718 takes the form of springs. Number of energy absorbing components 718 includes first energy absorbing component 726 and second energy absorbing component 728. First energy absorbing component 726 may provide tension relief. Second energy absorbing component 728 may provide compression relief.

Number of energy absorbing components 718 contacts disc 713. Disc 713 may be associated with rod 708 and pin 712. More specifically, rod 708 and pin 712 may extend through disc 713. Disc 713 provides desirable faces for number of energy absorbing components 718 to be seated against.

End cap 706 may keep second energy absorbing component 728 within cavity 720. End cap 706 may keep other parts in addition to second energy absorbing component 728 within cavity 720. End cap 706 may be connected to body 710 using any desirable method. In this illustrative example, end cap 706 may be connected to first end 730 of body 710 using a threaded connection.

Figure 8:
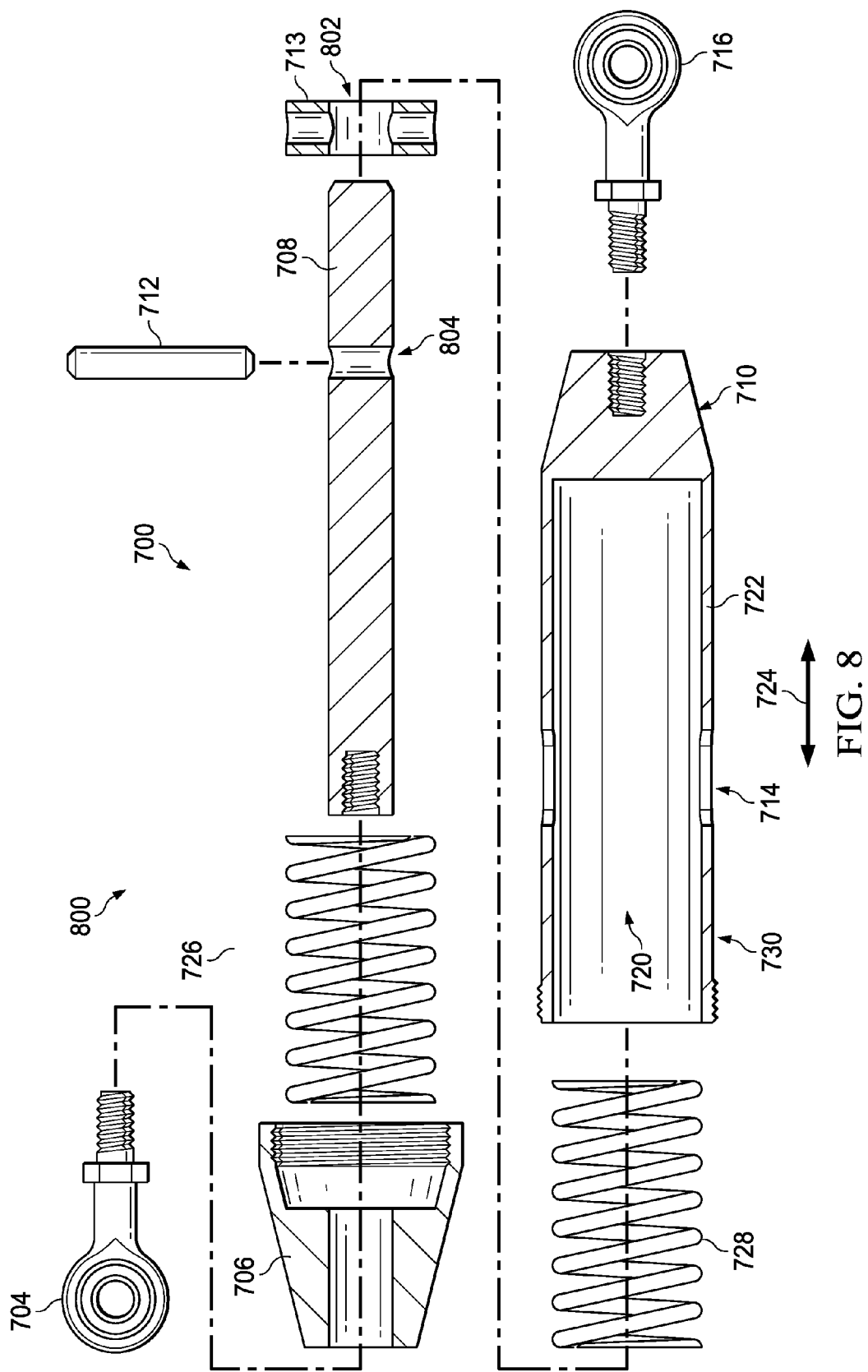
FIG. 8 is an illustration of an exploded view of a load relief tie rod in accordance with an illustrative embodiment.

Turning now to FIG. 8, an illustration of an exploded view of a load relief tie rod is depicted in accordance with an illustrative embodiment. View 800 may be an exploded view of load relief tie rod 700 of FIG. 7.

In view 800, holes 802 through disc 713 are depicted. Pin 712 and rod 708 may extend through holes 802 in disc 713 when load relief tie rod 700 is assembled. Hole 804 through rod 708 is also depicted in view 800. Pin 712 may be inserted through hole 804 when load relief tie rod 700 is assembled. Although only pin 712 is depicted in view 800, in other illustrative examples, more than one pin may be present. In these illustrative examples, the more than one pin may be connected using threads or other desirable connecting means.

Figure 9:
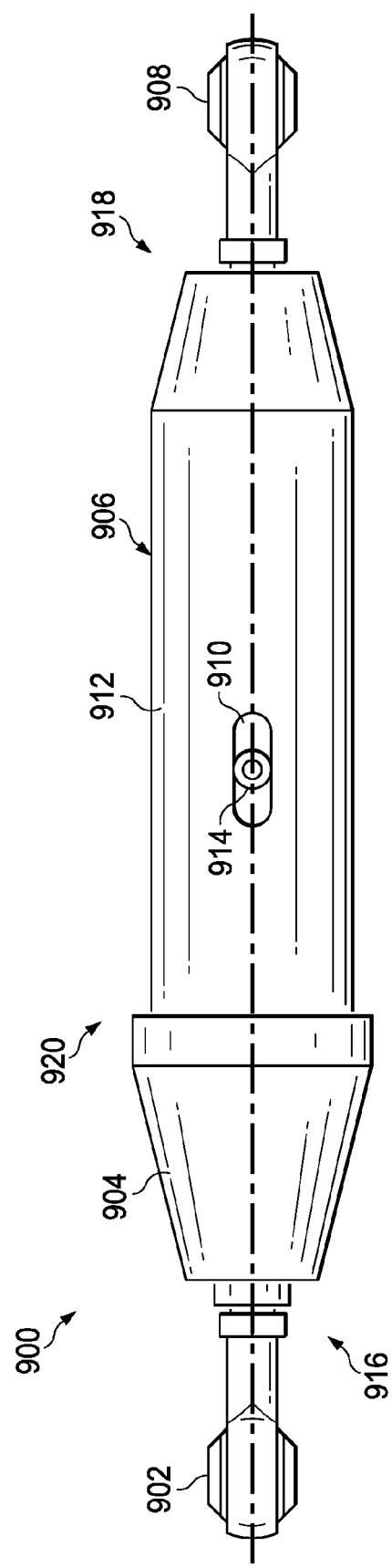
FIG. 9 is an illustration of a side view of a load relief tie rod in accordance with an illustrative embodiment.

Turning now to FIG. 9, an illustration of a side view of a load relief tie rod is depicted in accordance with an illustrative embodiment. View 900 may be a view of either load relief tie rod 500 of FIGS. 5 and 6 or load relief tie rod 700 of FIGS. 7 and 8.

In view 900, mount 902, end cap 904, base 906, and mount 908 are depicted. In this illustrative example, obround slot 910 is shown in cylindrical section 912 of base 906. Pin 914 extends through obround slot 910.

In this illustrative example, obround slot 910 is centered between first end 916 and second end 918 of load relief tie rod 920. As obround slot 910 is centered between first end 916 and second end 918 of load relief tie rod 920, load relief tie rod 920 may provide both tension relief and compression relief. As depicted, load relief tie rod 920 may be in a neutral state in which neither tension nor compression is applied to load relief tie rod 920.

Figure 10:
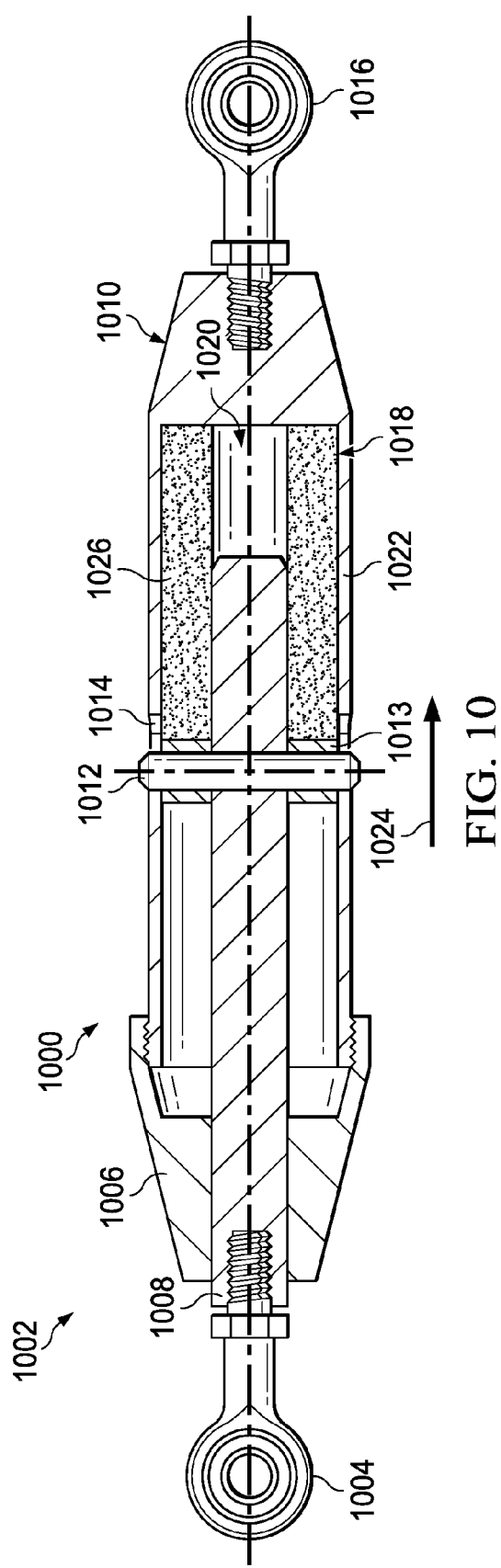
FIG. 10 is an illustration of a cross-sectional view of a load relief tie rod in accordance with an illustrative embodiment.

Turning now to FIG. 10, an illustration of a cross-sectional view of a load relief tie rod is depicted in accordance with an illustrative embodiment. Load relief tie rod 1000 may be a physical implementation of load relief tie rod 213 of FIG. 2. Load relief tie rod 1000 may be used in aircraft 100 of FIG. 1, cabin 300 of FIG. 3, or assembly 400 of FIG. 4.

View 1002 of load relief tie rod 1000 is a cross-sectional view. In view 1002, mount 1004, end cap 1006, rod 1008, body 1010, pin 1012, disc 1013, obround slots 1014, mount 1016, and number of energy absorbing components 1018 are visible. As depicted, mount 1004 is connected to rod 1008 that extends through end cap 1006 and into cavity 1020 of body 1010. More specifically, rod 1008 extends longitudinally into cavity 1020 of cylindrical section 1022 of body 1010.

Pin 1012 is associated with rod 1008. In this illustrative example, pin 1012 is inserted through rod 1008. Pin 1012 and rod 1008 may have a press fit. Pin 1012 extends through rod 1008 and into obround slots 1014. Obround slots 1014 may restrict movement of pin 1012.

As compression is applied to load relief tie rod 1000, rod 1008 moves in direction 1024 within cavity 1020. As rod 1008 moves, number of energy absorbing components 1018 is compressed. In this illustrative example, number of energy absorbing components 1018 takes the form of a portion of energy absorbing gel. Number of energy absorbing components 1018 includes first energy absorbing component 1026. First energy absorbing component 1026 may provide compression relief.

Number of energy absorbing components 1018 contacts disc 1013. Disc 1013 may be associated with rod 1008 and pin 1012. More specifically, rod 1008 and pin 1012 may extend through disc 1013. Disc 1013 provides desirable faces for number of energy absorbing components 1018 to be seated against.

Figure 11:
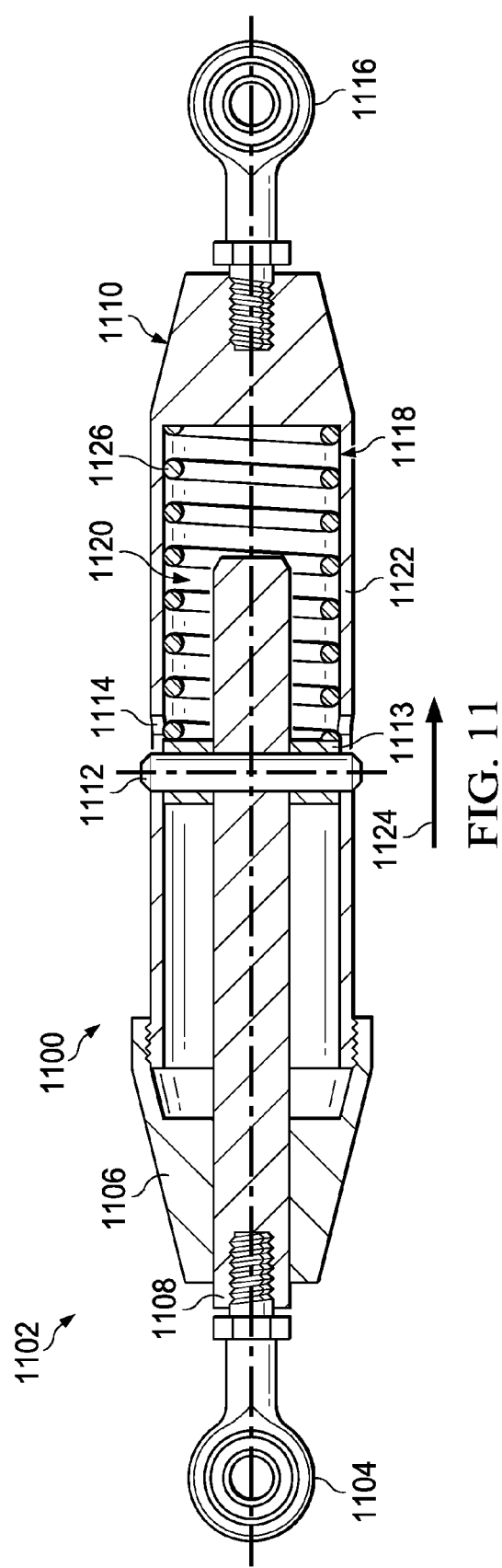
FIG. 11 is an illustration of a cross-sectional view of a load relief tie rod in accordance with an illustrative embodiment.

Turning now to FIG. 11, an illustration of a cross-sectional view of a load relief tie rod is depicted in accordance with an illustrative embodiment. Load relief tie rod 1100 may be a physical implementation of load relief tie rod 213 of FIG. 2. Load relief tie rod 1100 may be used in aircraft 100 of FIG. 1, cabin 300 of FIG. 3, or assembly 400 of FIG. 4.

View 1102 of load relief tie rod 1100 is a cross-sectional view. In view 1102, mount 1104, end cap 1106, rod 1108, body 1110, pin 1112, disc 1113, obround slots 1114, mount 1116, and number of energy absorbing components 1118 are visible. As depicted, mount 1104 is connected to rod 1108 that extends through end cap 1106 and into cavity 1120 of body 1110. More specifically, rod 1108 extends longitudinally into cavity 1120 of cylindrical section 1122 of body 1110.

Pin 1112 is associated with rod 1108. In this illustrative example, pin 1112 is inserted through rod 1108. Pin 1112 and rod 1108 may have a press fit. Pin 1112 extends through rod 1108 and into obround slots 1114. Obround slots 1114 may restrict movement of pin 1112.

As compression is applied to load relief tie rod 1100, rod 1108 moves in direction 1124 within cavity 1120. As rod 1108 moves, number of energy absorbing components 1118 is compressed. In this illustrative example, number of energy absorbing components 1118 takes the form of a spring. Number of energy absorbing components 1118 includes first energy absorbing component 1126. First energy absorbing component 1126 may provide compression relief.

Number of energy absorbing components 1118 contacts disc 1113. Disc 1113 may be associated with rod 1108 and pin 1112. More specifically, rod 1108 and pin 1112 may extend through disc 1113. Disc 1113 provides desirable faces for number of energy absorbing components 1118 to be seated against.

Figure 12:
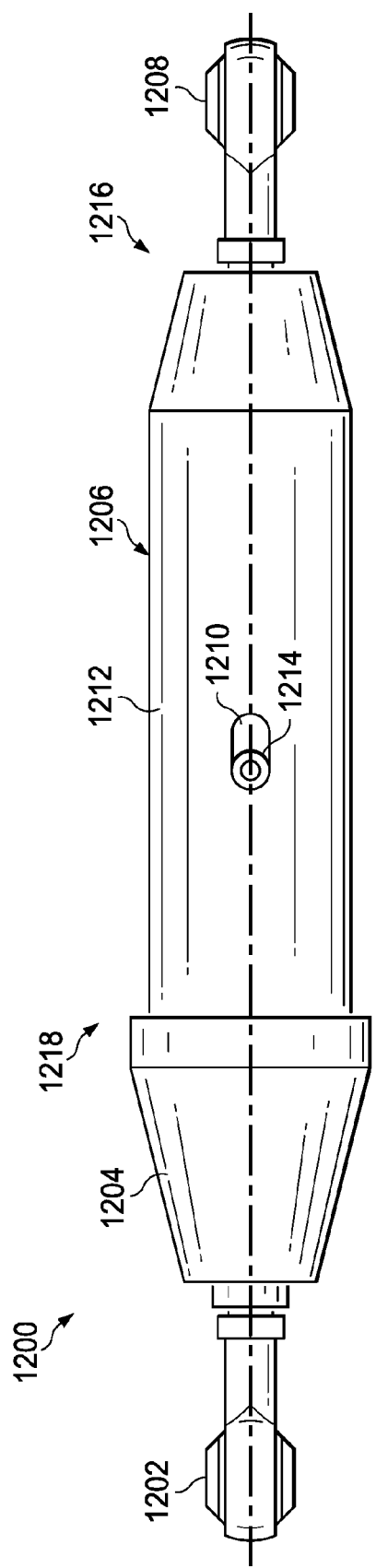
FIG. 12 is an illustration of a side view of a load relief tie rod in accordance with an illustrative embodiment.

Turning now to FIG. 12, an illustration of a side view of a load relief tie rod is depicted in accordance with an illustrative embodiment. View 1200 may be a view of either load relief tie rod 1000 of FIG. 10 or load relief tie rod 1100 of FIG. 11.

In view 1200, mount 1202, end cap 1204, base 1206, and mount 1208 are depicted. In this illustrative example, obround slot 1210 is shown in cylindrical section 1212 of base 1206. Pin 1214 extends through obround slot 1210.

In this illustrative example, obround slot 1210 is positioned closer to second end 1216 of load relief tie rod 1218. As obround slot 1210 is positioned closer to second end 1216 of load relief tie rod 1218, load relief tie rod 1218 may provide only compression relief. As depicted, load relief tie rod 1218 may be in a neutral state in which compression is not applied to load relief tie rod 1218.

Figure 13:
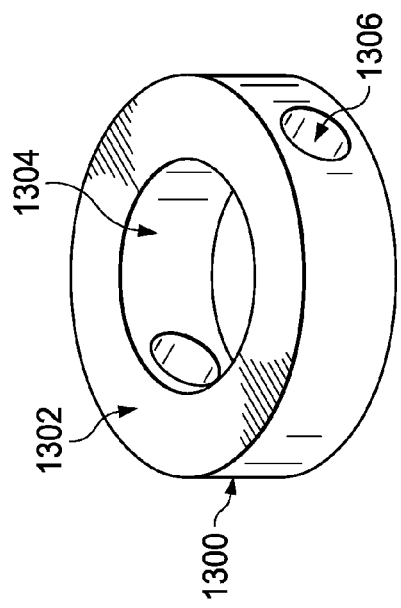
FIG. 13 is an illustration of an isometric view of a disc in accordance with an illustrative embodiment.

Turning now to FIG. 13, an illustration of an isometric view of a disc is depicted in accordance with an illustrative embodiment. Disc 1300 may be a physical embodiment of disc 223 of FIG. 2.

In some examples, disc 1300 may be the same as disc 513 of FIGS. 5 and 6. In some examples, disc 1300 may be the same as disc 713 of FIGS. 7 and 8.

Disc 1300 includes holes 1302. Holes 1302 include hole 1304 and hole 1306. Holes 1302 may be examples of holes 602 of FIG. 6. Holes 1302 may be examples of holes 802 of FIG. 8.

When disc 1300 is installed in a load relief tie rod, a rod, such as rod 216, may be inserted into hole 1304. For example, rod 508 of FIGS. 5 and 6 may be inserted into hole 1304 of disc 1300. As another example, rod 708 of FIGS. 7 and 8 may be inserted into hole 1304 of disc 1300.

When disc 1300 is installed in a load relief tie rod, a number of pins, such as number of pins 222 of FIG. 2, may be inserted into hole 1306. For example, pin 512 of FIGS. 5 and 6 may be inserted into hole 1306 of disc 1300. As another example, pin 712 of FIGS. 7 and 8 may be inserted into hole 1306 of disc 1300.

The different components shown in FIG. 1 and FIGS. 3-13 may be combined with components in FIG. 2, used with components in FIG. 2, or a combination of the two. Additionally, some of the components in FIG. 1 and FIGS. 3-13 may be illustrative examples of how components shown in block form in FIG. 2 may be implemented as physical structures.

Turning now to FIG. 14, an illustration of a flowchart of a method for providing at least one of tension relief or compression relief is depicted in accordance with an illustrative embodiment. Process 1400 may use load relief tie rod 213 of FIG. 2. Process 1400 may be implemented in at least one of aircraft 100, cabin 300, or assembly 400 to provide at least one of tension relief or compression relief.

Process 1400 may begin by removing a conventional tie rod from a first position of an assembly (operation 1402). Process 1400 then connects a load relief tie rod into the first position of the assembly, wherein the load relief tie rod comprises a body having a cavity extending longitudinally through a cylindrical section of the body and two obround slots in the cylindrical section; a rod configured to extend longitudinally within the cavity; and at least one pin extending from and perpendicular to the rod, wherein the at least one pin extends through the two obround slots (operation 1404). Afterwards, process 1400 terminates.

In some illustrative examples, the two obround slots provide the at least one of compression relief or tension relief. In other illustrative examples, the load relief tie rod further comprises at least one energy absorbing component positioned within the cavity. The at least one energy absorbing component may provide the at least one of compression relief or tension relief.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the assembly of process 1400 may be an aircraft. In this example, process 1400 may further comprise operating the aircraft.

Illustrative embodiments of the disclosure may be described in the context of aircraft manufacturing and service method 1500, as shown in FIG. 15, and aircraft 1600, as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15, and may include airframe 1602 with systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. One or more illustrative embodiments may be used during component and subassembly manufacturing 1506 in FIG. 15. For example, load relief tie rod 213 in FIG. 2 may be installed in platform 202 in FIG. 2 during component and subassembly manufacturing 1506 in FIG. 15. Further, load relief tie rod 213 in FIG. 2 may be used to create a replacement part for an assembly during maintenance and service 1514 in FIG. 15.

Thus, one or more illustrative embodiments may provide a method and apparatus for providing at least one of tension relief or compression relief. A load relief tie rod may be installed during manufacturing of a platform or as a retrofit to a platform.

A rod of the load relief tie rod may move during operation to adjust a length between a first mount and a second mount of the load relief tie rod. Movement of the rod within the cavity of the load relief tie rod provides at least one of tension relief or compression relief. When the rod moves within the cavity of the load relief tie rod, an energy absorbing component is compressed. The energy absorbing component is positioned in the cavity. In some illustrative examples, the energy absorbing component may be positioned near a first end of the load relief tie rod. In some illustrative examples, the energy absorbing component may be positioned near a second end of the load relief tie rod.

A number of pins extend from the rod and through a number of obround slots. As the rod moves within the cavity, the number of pins moves within the obround slots. The obround slots may restrict the extent of the movement of the rod.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A load relief tie rod comprising:
 a body having a cavity extending longitudinally through a cylindrical section of the body and two obround slots in the cylindrical section;
 a rod configured to extend longitudinally within the cavity;
 at least one pin extending from and perpendicular to the rod, wherein the at least one pin extends through the two obround slots; and
 at least one energy absorbing component positioned within the cavity, wherein the at least one energy absorbing component provides tension relief.

2. The load relief tie rod of claim 1, wherein the at least one energy absorbing component comprises at least one portion of energy absorbing gel.

3. The load relief tie rod of claim 1, wherein the at least one energy absorbing component comprises at least one spring.

4. The load relief tie rod of claim 1, wherein the at least one energy absorbing component comprises a first energy absorbing component and a second energy absorbing component where the first energy absorbing component provides compression relief and the second energy absorbing component provides the tension relief.

5. The load relief tie rod of claim 1, wherein the load relief tie rod is connected to a platform, and wherein the two obround slots fully engage with the at least one pin during an ultimate load of the platform.

6. A load relief tie rod comprising:
 a body having a first end, a second end, a cylindrical section, a cavity extending longitudinally through the cylindrical section from the first end towards the second end, and two obround slots in the cylindrical section;
 an end cap associated with the first end of the body;
 a rod extending through the end cap and configured to extend longitudinally within the cavity;
 at least one pin extending from and perpendicular to the rod, wherein the at least one pin extends through the two obround slots;
 an energy absorbing component positioned within the cavity between the at least one pin and the second end of the body; and
 a second energy absorbing component positioned within the cavity between the at least one pin and the end cap, wherein the second energy absorbing component provides tension relief.

7. The load relief tie rod of claim 6 further comprising:
 a mount connected to the rod; and
 a second mount connected to the second end of the cylindrical section.

8. The load relief tie rod of claim 6, wherein the end cap is connected to the body using a threaded connection.

9. The load relief tie rod of claim 6, wherein the energy absorbing component provides compression relief.

10. A method of providing load relief, the method comprising:
removing a conventional tie rod from a first position of an assembly; and
connecting a load relief tie rod into the first position of the assembly, wherein the load relief tie rod comprises a body having a cavity extending longitudinally through a cylindrical section of the body and two obround slots in the cylindrical section; a rod configured to extend longitudinally within the cavity; at least one pin extending from and perpendicular to the rod, wherein the at least one pin extends through the two obround slots; and at least one energy absorbing component positioned within the cavity, wherein the at least one energy absorbing component provides tension relief.

11. The method of claim 10, wherein the assembly is an aircraft and further comprising:
operating the aircraft.

12. The method of claim 10, wherein the at least one energy absorbing component comprises a first energy absorbing component and a second energy absorbing component where the first energy absorbing component provides compression relief and the second energy absorbing component provides the tension relief.

* * * * *